United States Patent [19]

Baloche et al.

[11] Patent Number: 5,611,599

[45] Date of Patent: Mar. 18, 1997

[54] VEHICLE SEAT HINGES

[75] Inventors: François Baloche; Yann Reubeuze, both of Flers, France

[73] Assignee: Bertrand Faure France, France

[21] Appl. No.: 503,892

[22] Filed: Jul. 18, 1995

[30] Foreign Application Priority Data

Jul. 22, 1994 [FR] France ................... 94 09109

[51] Int. Cl.⁶ .................................... B60N 2/20
[52] U.S. Cl. ...................... 297/367; 297/378.12
[58] Field of Search ................ 297/367, 378.12, 297/362

[56] References Cited

U.S. PATENT DOCUMENTS

| | | | |
|---|---|---|---|
| 3,958,828 | 5/1976 | Ishida et al. ................ | 297/367 X |
| 4,502,730 | 3/1985 | Kazaoka et al. . | |
| 4,660,886 | 4/1987 | Terada et al. . | |
| 4,995,669 | 2/1991 | Croft .......................... | 297/367 X |
| 5,161,856 | 11/1992 | Nishino ...................... | 297/367 |
| 5,383,710 | 1/1995 | Premji ........................ | 297/367 X |
| 5,393,116 | 2/1995 | Bolsworth et al. .......... | 297/367 X |

FOREIGN PATENT DOCUMENTS

| | | |
|---|---|---|
| 0082418 | 6/1983 | European Pat. Off. . |
| 3319593 | 12/1983 | Germany . |
| 3521730 | 12/1985 | Germany . |
| 2048367 | 12/1980 | United Kingdom . |

*Primary Examiner*—Peter R. Brown
*Attorney, Agent, or Firm*—Larson and Taylor

[57] ABSTRACT

The vehicle seat hinge comprises a first cheek plate (8) for the back, a second cheek plate (9) for the seat and co-operating with the first cheek plate to define a round housing, a ring (11) with an inside set of teeth associated with the first cheek plate and housed inside the housing, a control member (5), and a mechanism (M) inside the housing, controllable by said member, and co-operating with the set of teeth (12) of the ring to perform fine adjustment of the inclination of the back. The toothed ring is mounted to be angularly slidable along a complementary annular bearing surface (14) of the first cheek plate, and a second mechanism is provided inside the housing suitable for reversibly coupling the toothed ring to the first cheek plate and including two abutments that are angularly fixed relative to respective ones of said elements and suitable for storing each preadjusted position of the second element whenever they are uncoupled.

7 Claims, 4 Drawing Sheets

VEHICLE SEAT HINGES

FIELD OF THE INVENTION

The invention relates to vehicle seat hinges of the kind comprising a first cheek plate suitable for fixing to the framework of the seat back, a second cheek plate suitable for fixing to the framework of the seat proper and co-operating with the first cheek plate to define a housing, a ring having an inside set of teeth and secured to the first cheek plate inside the housing and having an axis that coincides with the horizontal axis X of the hinge, a control member accessible to the user of the seat, and a mechanism inside the housing, controllable by said member, and co-operating with the set of teeth of the ring to transform rotation of said member into angular displacement of the first cheek plate and thus of the seat back, or into commands enabling and disabling such angular displacements.

The mechanism in question may be constituted:

in a first case by a non-reversible gear train comprising, in particular, an eccentric satellite having two sets of teeth and interposed between the control member and the toothed ring; and in a second case by a locking device implementing a rotary cam secured to the control member, at least one slug having outside teeth suitable for co-operating with the set of teeth of the ring and mounted to slide radially under control of the cam in a respective guide formed in the second cheek plate, and a spring continuously urging said cam angularly towards its position that corresponds to the slug engaging the set of teeth of the ring, i.e. its position for locking the hinge.

Such known hinges (in which the toothed ring is secured to the first cheek plate and indeed is usually integral with said cheek plate) make it easy for the user of the seat to adjust the inclination of the seat back about the axis X while sitting on said seat.

Amongst such hinges, the invention relates more particularly to those that need to be capable of being temporarily unlocked so as to release the seat back for tilting rapidly forwards in order to provide access to the back seat(s) of the vehicle, when the vehicle has only one door on either side.

SUMMARY OF THE INVENTION

In particular, an object of the invention is to make it possible, after such angular unlocking, to return the back automatically to the preadjusted angular position that it occupied before being unlocked, with this being possible regardless of said angular position, and with this being achieved by a hinge that is particularly robust and that takes up little room, preferably being in the form of a round slab (not including its control members, naturally).

To this end, according to the invention, a hinge of the kind in question includes the above-specified elements and it is essentially characterized in that the toothed ring is mounted free rotate relative to the first cheek plate, and in that said hinge further includes, firstly a second mechanism inside the housing suitable for coupling the toothed ring and the first cheek plate in reversible manner with respect to their angular displacements about the axis X, which mechanism includes two abutments angularly fixed relative to the toothed ring and to the first cheek plate respectively, and suitable for memorizing said position by mutual angular engagement in the preadjusted position occupied by the first cheek plate at the beginning of each uncoupling, and secondly a second control member for said second mechanism and easily accessible from behind the seat back.

In preferred embodiments, use is made of one or more of the following dispositions:

the second mechanism comprises a transverse plate secured to the toothed ring and recessed by a slot having a radial length connected at its radially innermost end to a circularly arcuate length centered on the axis X, a slug having external teeth and slidably mounted in a radial guide included in the first cheek plate, said slug including a stud received for guidance purposes in the slot of the plate, and being suitable in its radially outermost position for co-operating with a second set of inside teeth carried by the toothed ring, a rotary cam for controlling displacements of the slug being linked to the second control member, and a spring constantly urging said cam towards its angular position in which it urges the toothed slug towards its radially outermost position;

the number of slots recessed in the transverse plate is equal to 3, said slots being identical and mutually offset by angles of 120° about the axis X, and the second mechanism comprises three toothed slugs whose studs are received in the three slots respectively;

the radial length of the slot is connected to the circularly arcuate length of said slot at an intermediate point therealong;

the transverse plate is disposed substantially in the middle of the axial thickness of the housing formed by the two cheek plates, between the two mechanisms respectively for adjusting the inclination of the back and for making it possible for the back to tilt down forwards; and the control member for the second mechanism is a knob disposed in the top region of the seat back and connected to a pulley secured to the corresponding cam by means of an inextensible cable housed in a sheath.

In addition to these main dispositions, the invention includes certain other dispositions which are preferably used simultaneously therewith and which are described in greater detail below.

Some preferred embodiments of the invention are described below (naturally in non-limiting manner), and with reference to the accompanying drawings.

DETAILED DESCRIPTION OF THE PREFERRED EMBODIMENTS

Figure 1:
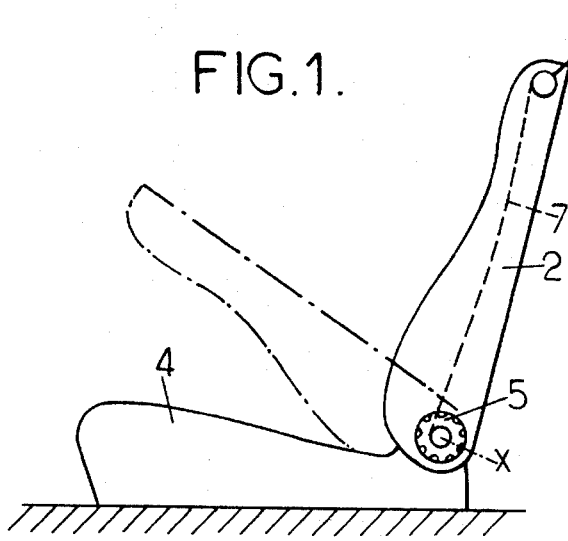
FIGS. 1 and 2 of the drawings are highly diagrammatic, showing a vehicle seat fitted with a hinge of the invention, respectively as seen from one side and as seen from behind.

In each case, the hinge in question is designed to make it possible to adjust the inclination of the framework 1 of a vehicle seat back 2 (FIGS. 1 and 2) relative to the framework 3 of the seat proper 4 thereof, about a fixed horizontal axis X, the adjustment being obtained by controlling a member, such as a rotary handle 5, that is easily accessible to a user sitting on the seat.

The adjustment in question is intended to make the seat comfortable for a user sitting thereon, and it is relatively fine, extending over a restricted angular range, e.g. of about 30°.

Figure 2:
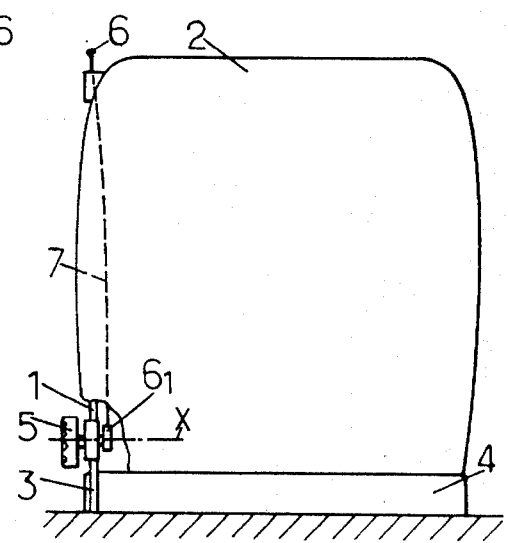

In this case, it is also desired that the back 2 be easily and quickly folded down onto the seat proper 4, as indicated in chain-dotted lines in FIG. 1, thereby facilitating access to the back seat(s) of the vehicle, assuming that the vehicle has only one door on each side.

To this end, the hinge must be capable of being unlocked by means of a second control member such as a knob 6 located at the top of the back 2, which knob is easily accessible from behind the back and is connected to the hinge via an inextensible sheathed cable 7.

Naturally, after being folded down as indicated, it is desirable for the back to be capable of being replaced automatically in the preadjusted position it occupied immediately before being folded down, so the hinge stores the corresponding preadjusted position each time the back is folded down.

Such "memory" hinges already exist.

The object of the invention is, above all, to provide a structure for such a memory hinge that is particularly robust and compact, and that is preferably in the form of a round slab.

To this end, the said hinge comprises, in known manner:

a first circular cheek plate 8 having an axis X securable to the frame 1 of the back in any desirable manner, in particular by means of bolts (not shown);

a second circular cheek plate 9 about the axis X similarly securable to the frame 3 of the seat proper, and suitable for co-operating with the first cheek plate 8 and with an annular channel section metal bar 10 covering both cheek plates and secured to one of them, to form a round slab-shaped housing;

a ring 11 about the axis X having an inside set of teeth 12 received inside said housing in the vicinity of its periphery, and free to rotate about the axis X relative to the cheek plate 9;

a rotary shaft 13 on the axis X passing through the second cheek plate and secured to the handle 5; and a mechanism M interposed between the shaft 13 and the toothed ring 11, which mechanism is suitable for transforming rotation of said shaft into angular displacement of the cheek plate 8 that is secured to the back or into commands authorizing and preventing such angular displacements.

In other words, the mechanism M which is controllable by rotating the handle 5 enables the angular position of the back to be adjusted finely.

In known hinges of the above kind, said toothed ring 11 is permanently constrained to move angularly with the cheek plate 8 secured to the back, and indeed is generally integral with said plate, such that the adjustments in question are specifically "comfort" adjustments concerning back inclination.

In the present case, and as explained below, the toothed ring 11 is constrained to move angularly with the cheek plate 8 secured to the back, but not on a permanent basis.

Figure 3:
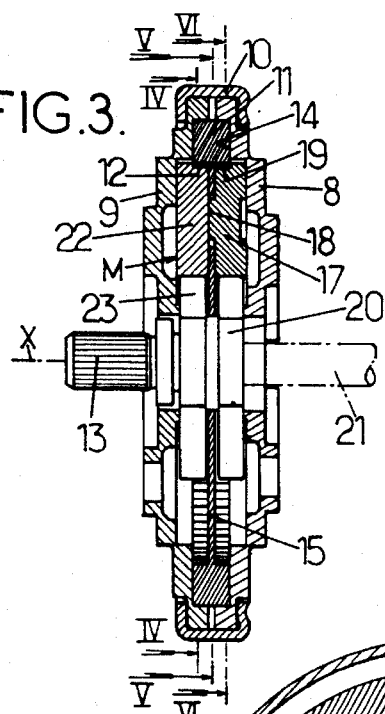
FIG. 3 is an axial section through a first embodiment of such a hinge in a locked, rest position.
Figure 4:
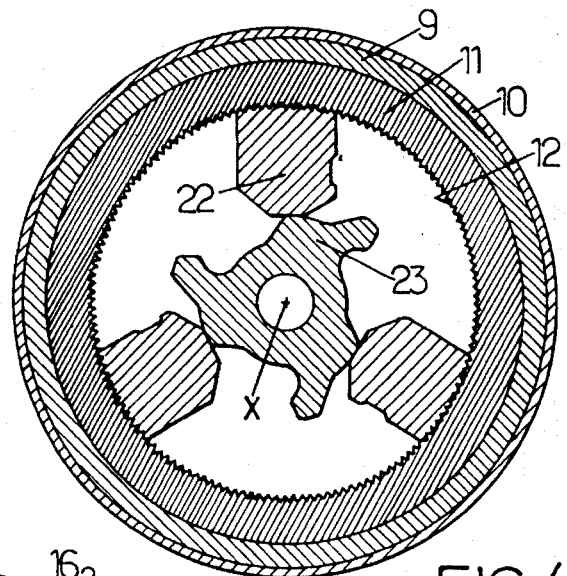
FIGS. 4, 5, and 6 show the same hinge in cross-section, on planes IV—IV, V—V, and VI—VI respectively of FIG. 3.
Figure 5:
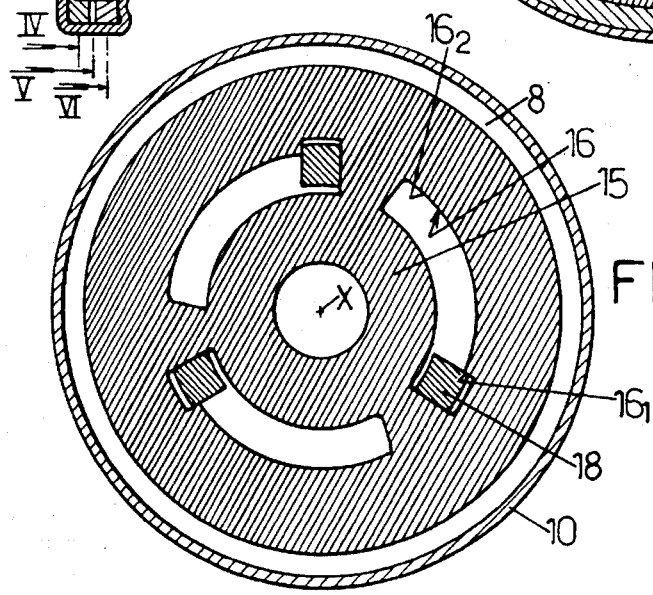
Figure 6:
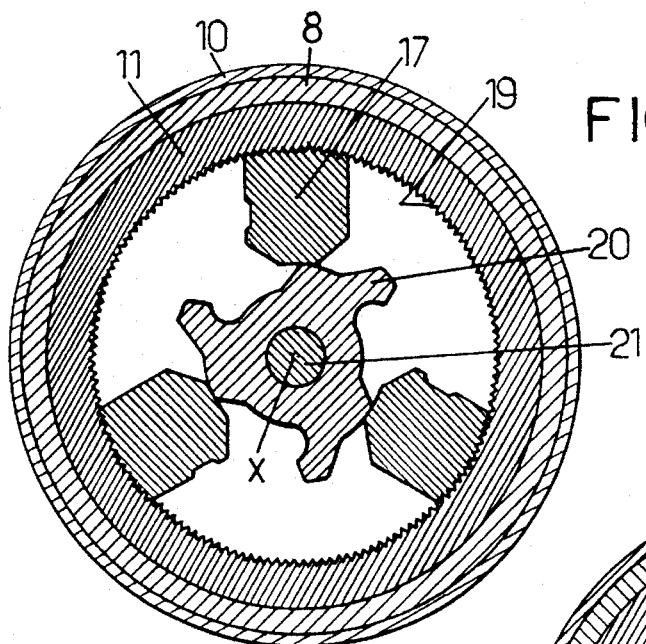
Figure 12:
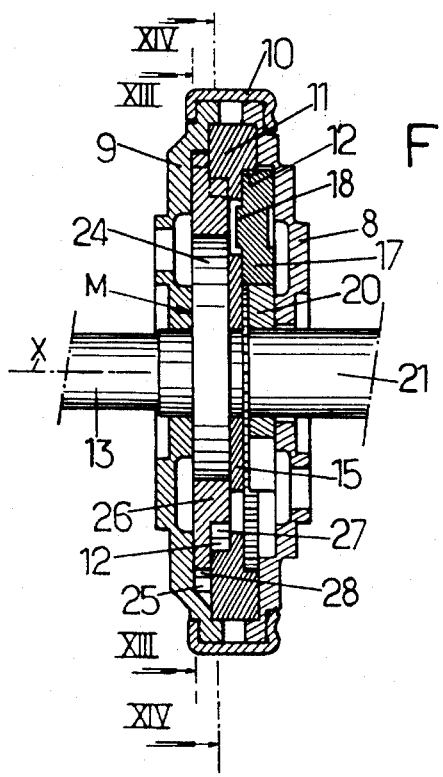
FIG. 12 is an axial section through a second embodiment of a hinge of the invention in its normal, or rest state.
Figure 13:
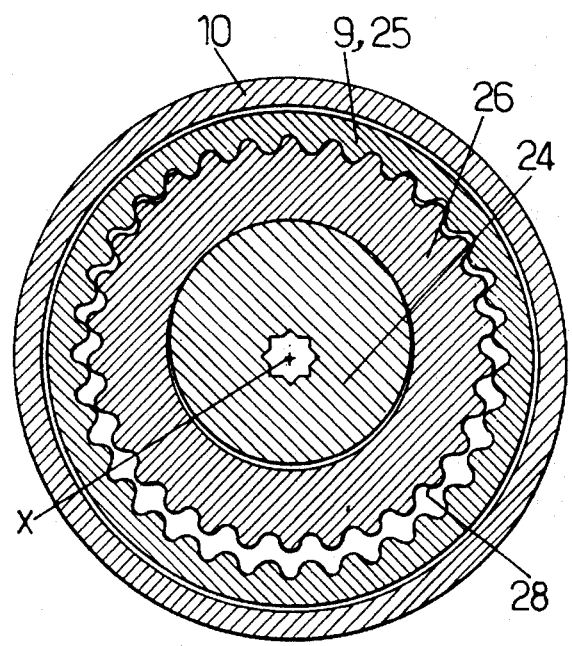
FIGS. 13 and 14 are cross-sections of FIG. 12 on planes XIII—XIII and XIV—XIV respectively.
Figure 14:
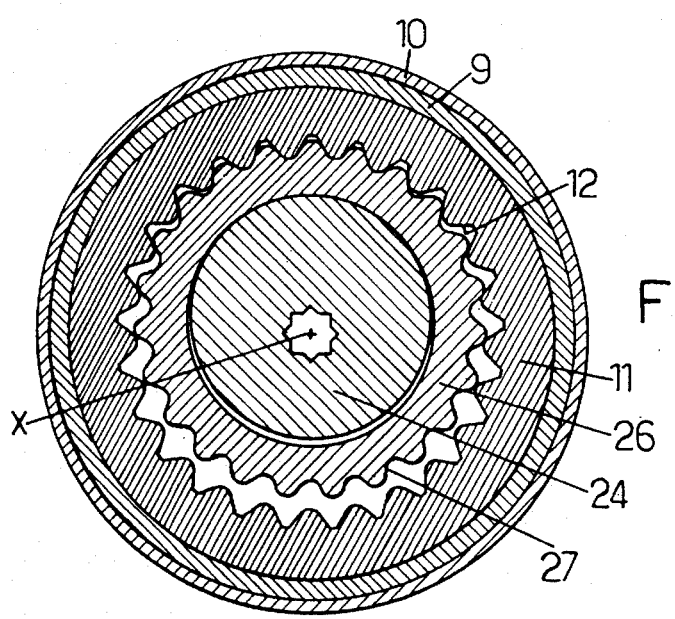

However the actual structure of the mechanism M interposed between the rotary shaft 13 and the toothed ring 11 is of a type known per se, and two embodiments of such a mechanism M are described below with reference respectively to FIGS. 3, 4, and 7, and to FIGS. 12 to 14.

The invention relates essentially to the means which are provided herein, independently of the mechanism M, for temporarily unlocking the hinge so as to make it possible to fold the back 2 down quickly, and then return it exactly into its preadjusted angular position.

To this end, the toothed ring 11 is, in this case, mounted free to rotate relative to the cheek plate 8, and in particular it is mounted so as to be capable of sliding angularly in a complementary annular bearing surface 14 of said cheek plate 8, and means are provided for mutually coupling or decoupling the ring 11 and the cheek plate 8 at will with respect to rotation about the axis X.

These couping and decoupling means comprise:

a transverse plate 15 secured to the toothed ring 11 and recessed by at least one slot 16 that has a radial length $16_1$ connected at its axially inner end to a length $16_2$ that extends in a circular arc centered on the axis X;

an externally toothed slug 17 slidably mounted in a radial guide (not shown) contained in the cheek plate 8, said slug including a stud 18 received for guidance purposes in the slot 16 and being suitable for co-operating with a second set of internal teeth 19 about the axis X and carried by the ring 11 when the slug is in its radially outermost position from the axis X;

a rotary cam 20 for controlling radial displacement of the slug 17, which cam is secured to a rotary shaft 21 that constitutes a portion of the control member 6 or that is constrained to move angularly therewith; and a spring R (not shown) constantly urging the cam 20 towards its angular position in which it urges the toothed slug 17 towards its radially outermost position.

In the preferred embodiments shown, the number of slots 16 formed through the plate 15 is equal to 3, these slots are identical and mutually offset by angles of 120° about the axis X, so three toothed slugs 17 are provided having their studs 18 received in respective ones of the three slots 16.

The assembly operates as follows.

At rest, i.e. when neither of the two control members 5 and 6 is being operated:

the toothed ring 11 is prevented from rotating; and the slugs 17 are in their radially outermost positions and engage with the set of teeth 19 of the ring 11, while their studs 18 are received in the radial lengths $16_1$ of the slots 16, thereby constraining the slugs to be angularly fastened with the plate 15, and thus also with the then-fixed toothed ring 11.

Since the slugs 17 are constrained by means of their guides to move angularly with the cheek plate 8 and thus with the back 2, the back is prevented from moving angularly.

This angular position of the back is assumed to be its adjusted position, and is referred to below as its "preadjusted" position.

If the user then actuates control member 6, the cam 20 is caused to pivot about the axis X against the action of its return spring R, thereby releasing the toothed slugs 17 radially.

These slugs may be urged radially inwards by means of an auxiliary spring (not shown), which spring may be constituted, for example, by a metal wire extending around a discontinuous circle centered on the axis X and passing over bearing surfaces of the three slugs that are axially offset from their sets of teeth.

Figure 8:
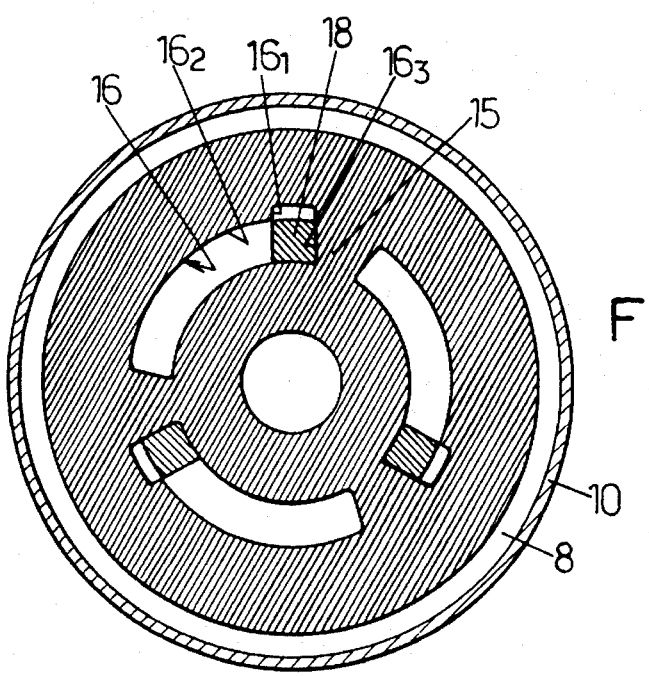
FIGS. 8 and 9 are cross-sections on the same planes as FIGS. 5 and 6 respectively, but for a decoupled position of the hinge, making it possible to tilt the back down forwards.
Figure 9:
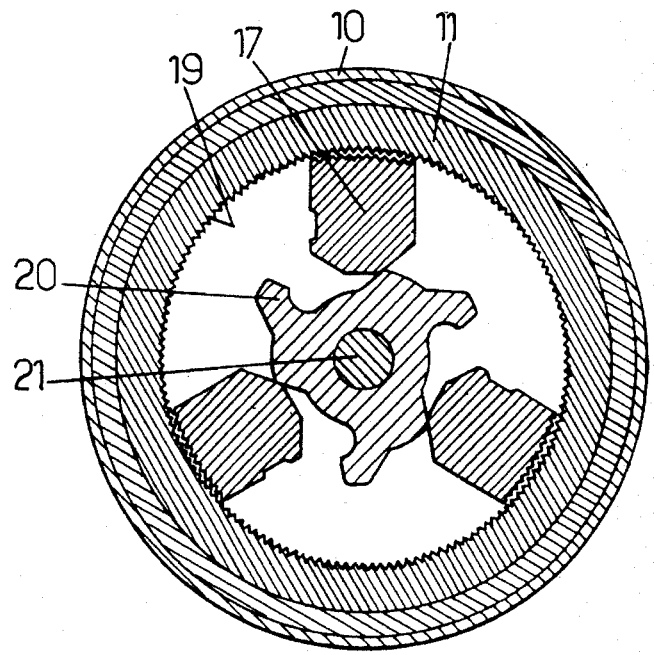

The slugs 17 thus disengage from the set of teeth 19, as can be seen in FIG. 9, and simultaneously their studs 18 follow the radial lengths $16_1$ of the slots 16 so as to penetrate into the connections between said radial lengths and the circularly arcuate lengths $16_2$ of the slots, as can be seen in FIG. 8.

It is then possible to displace the assembly constituted by the cheek plate 8, the slugs 17 contained in the radial guides of the cheek plate, and the cam 20 angularly: there is no longer any obstacle to angular displacement of the studs 18 relative to the plate 15 since the studs are free to move along the circularly arcuate lengths $16_2$ of the slots 16.

Figure 10:
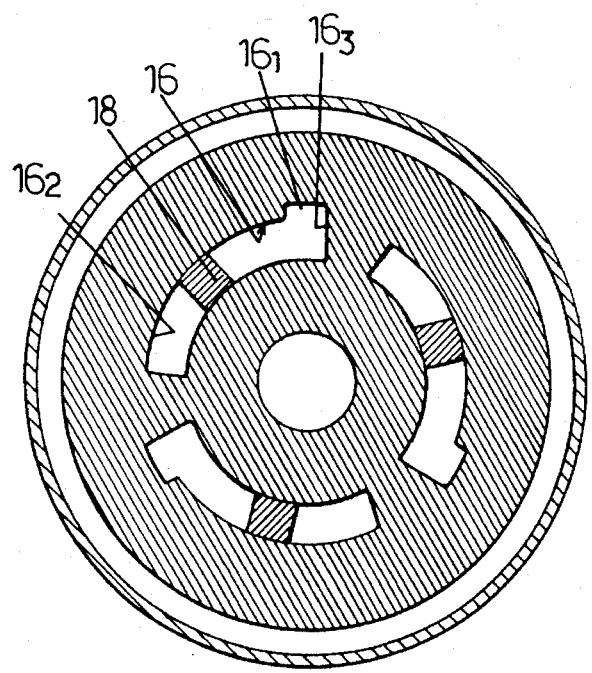
FIGS. 10 and 11 are cross-sections similar to FIGS. 8 and 9, but corresponding to the back in its forwardly tilted-down position.
Figure 11:
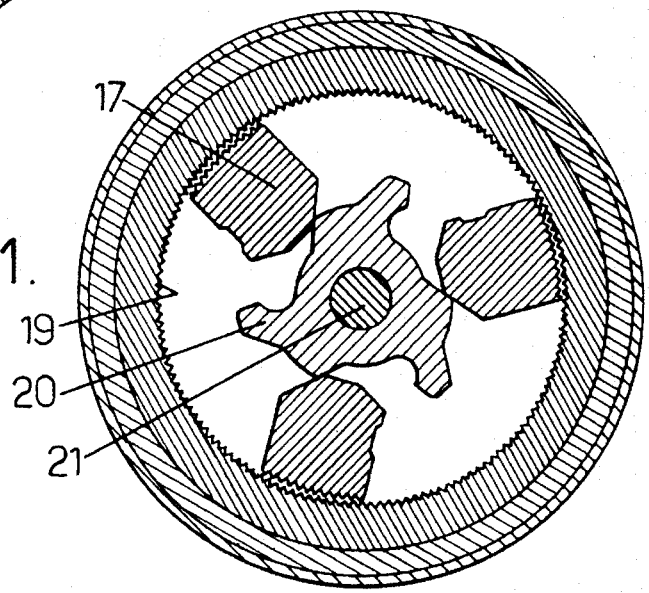

It is then possible to fold down the back 2 and FIGS. 9 and 10 show the positions occupied respectively by the cam 20 and by the studs 18 when the back is in a folded-down position.

Naturally, while the back is folded down, the plate 15 remains stationary and the same applies to the radial lengths $16_1$ of the slots 16 in the plate, thereby defining the preadjusted position of the back.

It should also be observed that as soon as the studs 18 engage in the circularly arcuate lengths $16_2$ of the corresponding slots 16, the studs can no longer move radially inwards: it is then possible to release the control member 16 without running the risk of the slugs 17 returning prematurely into their radial engagement position.

When the back is raised rearwards, after being folded down forwards, the studs 18 come again into abutment at the end of the stroke against the end edges $16_3$ of the lengths $16_1$: the back 2 has then returned to its preadjusted position, and the resilient final return of the cam 20 to its original angular position has the effect of urging the slugs 17 radially outwards again towards their radially outermost positions where they mesh again with the set of teeth 19, the corresponding radial sliding being made possible because the studs 18 are then in engagement with the radial lengths $16_1$ of the slots 16.

The hinge is thus again locked in its preadjusted position.

It should be observed that while the back is being tilted, the cam 20, and thus also the shaft 21 together with a portion of the control member 6 are rotated with the back about the axis X: the presence of the flexible cable 7 between the knob or endpiece, of said member, that is directly actuatable by the user, and a pulley or wheel $6_1$ secured to the shaft 21 makes it possible for these rotations to occur without giving rise to significant displacements of said knob.

The following may also be observed:
the transverse plate 15 secured to the ring 11 is located in the middle of the axial extent of the housing, thus forming a kind of partition separating the two mechanisms that are respectively concerned with fine or "comfort" adjustment of the inclination of the back and with folding said back down; this plate may be integrally formed with the ring 11, in particular by being molded together therewith, as shown in the drawings, however it could also be constrained to move angularly with said ring by having a set of teeth provided at the periphery thereof and suitable for engaging with complementary teeth provided on the inside face of the ring, said teeth preferably being in axial alignment with the set of teeth 12 and/or 19 already carried by said ring 11; and the two shafts 13 and 21 on the axis X concerned respectively with controlling the fine adjustment mechanism and with controlling the "folding-down" mechanism may extend axially through opposite sides of the housing as shown in the drawings, but they could equally well be concentric, one of them being tubular in shape and surrounding the other.

Two embodiments known per se of the mechanism M for performing fine or "comfort" adjustment of the inclination of the back are described below firstly with reference to FIGS. 3, 4, and 7, and secondly with reference to FIGS. 12, 13, and 14.

Each of these mechanisms is interposed between the rotary shaft 13 and the inside set of teeth 12 of the ring 11, which ring is not permanently constrained to rotate with the cheek plate 8 of the back, as in known embodiments, but is capable, in this case, of being decoupled from said cheek plate, as mentioned above.

In the first embodiment, the mechanism makes it possible to lock and unlock the hinge for a multitude of different inclinations of the back.

The mechanism comprises:

at least one externally toothed slug 22 suitable for sliding in a radial guide (not shown) contained by the cheek plate 9 of the seat proper and suitable for co-operating in its radially outermost position with the set of teeth 12;

a rotary cam 23 secured to the shaft 13 and suitable for controlling radial sliding of the slugs 22; and a spring (not shown) permanently urging the cam 23 in an angular direction appropriate for causing it to urge the slugs 22 outwards.

Figure 7:
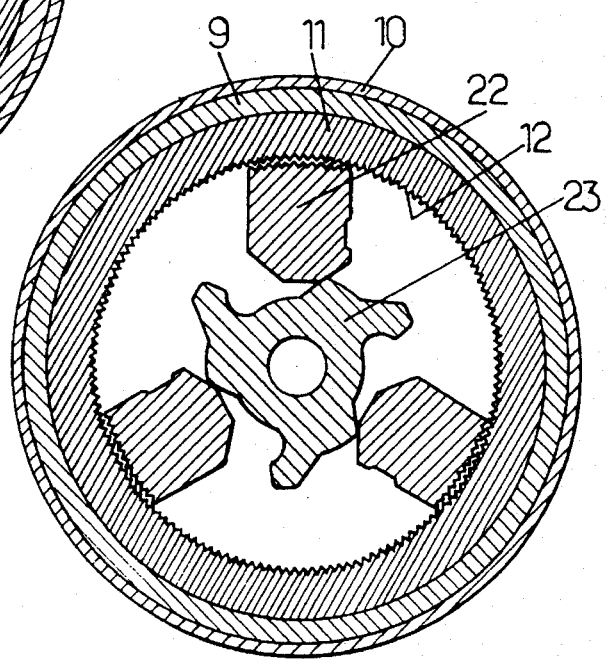
FIG. 7 is a cross-section on the same plane as FIG. 4 but for an unlocked position of the hinge corresponding to fine adjustment of back inclination.

This mechanism operates as follows:

at rest, the toothed slugs 22 engage with a set of teeth 12, (FIG. 4), thereby locking the hinge; and when, on the contrary, the handle 5 is turned against the return force of the opposing spring, the slugs 22 are released radially, possibly with help from a spring of the kind described above for urging the slugs 17 radially inwards, thereby moving away from the teeth 12, as can be seen in FIG. 7.

The set of teeth 12, and thus the toothed ring 11 and the framework 8 of the seat back which is secured thereto can then be adjusted in inclination, in particular merely by the user pressing against the back of the seat against the opposing force of an appropriate spring.

Once the comfortable inclined position has been found, it suffices to release the handle 5 so that the cam 23 returns to its initial angular position, thereby putting the slugs 22 back into engagement with the ring of teeth 12, thereby locking the hinge again in the resulting adjusted comfort position.

The mechanism of the second embodiment is a non-reversible gear train, comprising:

an eccentric circular disk 24 constrained to rotate with the shaft 13 a circular inside set of teeth 25 about the axis X and secured to the cheek plate 9, being disposed at the periphery thereof, inside the housing; and a satellite 26 having two outside sets of teeth and mounted freely on the disk 24, having its small and large sets of teeth meshing respectively with the inside set of teeth 12 of the ring 11 and with the inside set of teeth 25 of the cheek plate 9.

This mechanism operates as follows: any angular displacement of the handle 5 and thus of the shaft 13 causes the eccentric disk 24 to rotate; this rotation generates angular displacement of much smaller amplitude of the inside set of teeth 12 of the ring 11, and thus of the cheek plate 8 and of the back 2 which are secured thereto.

As a result, and whichever embodiment is used, a "memory" seat hinge is obtained whose structure and operation can be seen sufficiently clearly from the above.

This hinge has numerous advantages over previously known memory hinges, in particular in that it is particularly robust and is in the form of a slab that is preferably round and that takes up very little room.

Naturally, and as can already be seen from the above, the invention is not limited in any way to the particular applications and embodiments described more specifically above; on the contrary, it extends to any variants, and in particular:

those in which the inside set of teeth 19 on the ring 11 is discontinuous, i.e. constituted by toothed sectors each disposed radially facing one of the toothed slugs 17 for the angular position of the slug that corresponds to the beginning or the end of each "uncoupling", with it being possible in the limit for each co-operating unit comprising a toothed slug 17 and the corresponding teeth 19 to be replaced by a single radial finger co-operating with a single complementary radial notch;

those in which the angular displacements of the back from its preadjusted inclination position can be performed at will in either direction from the preadjusted position, i.e. not only forwards so as to release access to the back seat(s) of the vehicle, but also backwards so as to reach a bed position, in which case the radial length $16_1$ of each slot 16 is then connected at its inside end to the circularly arcuate length $16_2$ of the same slot, not at one of the ends of said slot, but at an intermediate point therealong, with the total number of slots advantageously being equal to two under such circumstances.

We claim:

1. A seat hinge for a vehicle seat, comprising:

a first cheek plate for fixing to a framework of a seat back;

a second cheek plate for fixing to a framework of a seat proper and co-operating with the first cheek plate to define a housing;

a ring having a first set of inside teeth and secured to the first cheek plate inside the housing and having a ring axis coinciding with the hinge axis;

a first control member accessible to a user of the seat; and a first mechanism inside the housing, controllable by said first control member, and co-operating with the first set of teeth of the ring to transform rotation of said first control member into angular displacements of the first cheek plate and of the seat back and into commands enabling and disabling such angular displacements, the toothed ring being rotatively mounted relative to the first cheek plate, said hinge further including a second mechanism inside the housing, cooperating with the toothed ring and the first cheek plate in reversible manner, said second mechanism including:

at least one locking member displaceable between a locked position wherein said locking member couples the toothed ring and the first cheek plate with respect to their angular displacements about the hinge axis of rotation, and an unlocked position wherein said locking member enables angular displacements of the first cheek plate relative to the toothed ring about the ring axis, elastic means for urging the locking member towards said locked position, a second control member easily accessible from behind the seat back for displacing said locking member into said unlocked position, two abutments angularly fixed relative to the toothed ring and to the first cheek plate respectively, and defining, by mutual angular engagement, a predetermined angular position of the first cheek plate relative to the toothed ring, said abutments enabling only angular displacement of the first cheek plate in a first angular direction starting from said predetermined relative angular position and preventing angular displacement of said first cheek plate in a second, opposite angular direction starting from said predetermined relative angular position, and means cooperating with said locking member when the first cheek plate is not in said predetermined relative angular position, for maintaining said locking member in said unlocked position.

2. A hinge according to claim 1, wherein the second mechanism comprises:

a transverse plate secured to the toothed ring and recessed by a slot having a radial length connected at its radially innermost end to a circularly arcuate length centered on the hinge axis, said locking member having external teeth and being slidably mounted in a radial guide included in the first cheek plate, said locking member including a stud received for guidance in the slot of the transverse plate, said arcuate length of the slot comprising said means cooperating with said locking member for maintaining the locking member in said unlocked position, and said locking member co-operating in said locked position with a second set of inside teeth carried by the toothed ring, a rotary cam for controlling displacements of the locking member, said cam being linked to the second control member, and a spring constantly urging said cam towards an angular position in which it urges the locking member radially outwardly towards said locked position.

3. A hinge according to claim 2, wherein the number of slots recessed in the transverse plate equals 3, said slots being identical and mutually offset by angles of 120° about the hinge axis, the second mechanism comprising three locking members having studs received in the three slots respectively.

4. A hinge according to claim 2, wherein the radial length of the slot extends radially outwardly from an intermediate point along the arcuate length of said slot.

5. A hinge according to claim 2, wherein the transverse plate is disposed substantially in the middle of the axial thickness of the housing formed by the first and second cheek plates between said first and second mechanisms.

6. A hinge according to claim 2, wherein the second control member comprises a knob disposed in a top region of the seat back and connected to a pulley secured to the corresponding cam by means of an inextensible cable housed in a sheath.

7. A hinge according to claim 1, wherein the housing is round and flat.

* * * * *